Patented Apr. 16, 1940

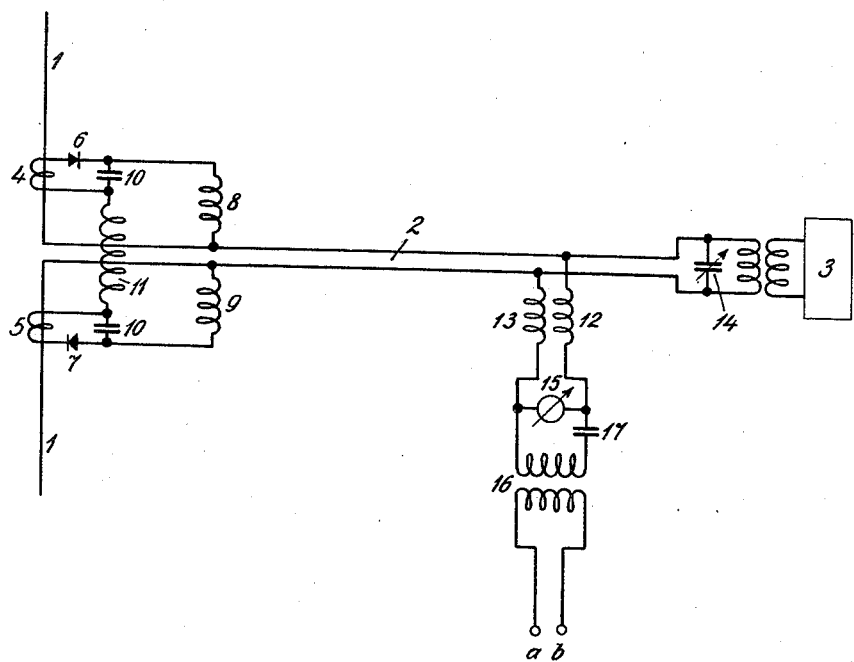

2,197,494

UNITED STATES PATENT OFFICE 2,197,494

ANTENNA SYSTEM

Dietrich Erben, Berlin-Mariendorf, Germany, assignor to C. Lorenz Aktiengesellschaft, Berlin-Tempelhof, Lorenzweg, Germany, a company Application February 1, 1938, Serial No. 188,074
In Germany November 7, 1936

4 Claims. (Cl. 250—33)

In the operation of antenna systems it is in many cases necessary to inspect the condition of working thereof. Thus, with radio beacons employed in aircraft navigation the readiness for service must be continuously ascertained as regards both the guide beam antennae and those antenna systems which serve to produce certain signals, namely the so-called presignal and main signal.

It is well known to dispose measuring instruments in the oscillation generator of these systems or in the energy line by which this generator is connected to the antennae, such measuring instruments serving to indicate the antenna current. However in the case of shortwave antennae an antenna current may happen to flow over short-circuit points or line capacities even if the antenna structure is defective. Also, with the known arrangements it is difficult to afford means for a remote indication of the readiness for service.

In arrangements as provided by the invention, a part of the energy is taken out of the antenna structure and rectified at some point in close proximity to this structure, whereupon such energy is used for effecting the desired remote indication.

One embodiment of the invention is shown by way of example in the accompanying drawing which is a diagrammatic representation of this embodiment.

A dipole 1 is connected to an oscillation generator 3 by a high frequency line 2 and a coupling device 14. To the dipole halves high frequency transformers 4, 5 are joined. Connected to each transformer 4, 5 is a rectifier 6, 7 by which the part of energy taken out of the dipole is rectified. This rectified energy is conveyed into line 2 over chokes 8, 9. Furthermore, a symmetrical arrangement comprising capacities 10 and an inductance 11 is provided as shown. The continuous current passing over the chokes 8, 9 into line 2 is taken from the line before reaching the oscillator arrangement 14, 3, and is conveyed through chokes 12, 13 to a direct voltage measuring instrument 15. On this continuous current an alternating current will be superimposed, if modulated high frequency currents are passing to the dipole along line 2. Instrument 15 acts to indicate a voltage proportional to the high frequency voltage flowing in the dipole, whereby the condition of operation of the dipole may be ascertained at any time. Connected in parallel with instrument 15 are a low frequency transformer 16 and a condenser 17. Over transformer 16 an alternating voltage at the modulation frequency is impressed upon wires $a$, $b$, and which is carried by the wires $a$, $b$ to a distant place in order there to serve for a remote indication.

Whenever one of the dipole halves is damaged the direct voltage at instrument 15 decreases to half the normal value, since in such case only one of the pick-up coils 4, 5 has voltage induced therein for supplying energy to instrument 15. In the case of injury to line 2 the voltage at instrument 15 becomes zero. Therefore the condition of operation of the dipole may be ascertained at any time.

What is claimed is:

1. The combination of an antenna structure with an oscillation generator coupled to said antenna structure for deriving energy at the frequency of the oscillator therefrom, rectifier means connected to said last named coupling means and in close proximity with said antenna structure for rectifying the energy thus derived, and means for producing a remote indication in response to said rectified energy.

2. The combination of a dipole, a high frequency transformer joined to one half of this dipole, a high frequency transformer joined to the other half thereof, these transformers serving to derive energy from the dipole, a rectifier connected to one of said transformers, a rectifier connected to the other transformer, an oscillation generator, an energy line for interconnecting this oscillation generator and the dipole, means to impress the said rectified energy upon said energy line, means for deriving from such energy line the rectified energy impressed upon it, and means for causing this energy to effect a remote indication.

3. A combination acording to claim 2, wherein the said rectifiers are connected in push-pull.

4. A combination according to claim 1, having indicating means adapted to respond to the said rectified energy, means for generating alternating currents in accordance with the modulated antenna currents, and means for causing the said alternating currents to effect a remote indication.

DIETRICH ERBEN.